(12) United States Patent
Han et al.

(10) Patent No.: US 11,538,404 B2
(45) Date of Patent: Dec. 27, 2022

(54) PIXEL DRIVING STRUCTURE AND DISPLAY PANEL

(71) Applicant: BOE TECHNOLOGY GROUP CO., LTD., Beijing (CN)

(72) Inventors: Seungwoo Han, Beijing (CN); Haoliang Zheng, Beijing (CN); Li Xiao, Beijing (CN); Minghua Xuan, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/476,798

(22) Filed: Sep. 16, 2021

(65) Prior Publication Data

US 2022/0101783 A1 Mar. 31, 2022

(30) Foreign Application Priority Data

Sep. 25, 2020 (CN) .......................... 202011026398.8

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01); *G09G 2310/0267* (2013.01); *G09G 2310/0275* (2013.01); *G09G 2310/0291* (2013.01); *G09G 2310/061* (2013.01)

(58) Field of Classification Search
CPC ............ G09G 3/32; G09G 2300/0426; G09G 2300/0852; G09G 2310/0267; G09G 2310/0275; G09G 2310/0291; G09G 2310/061

See application file for complete search history.

(56) References Cited

U.S. PATENT DOCUMENTS

| 10,504,406 | B2 * | 12/2019 | Shigeta | ................ G09G 3/2081 |
|---|---|---|---|---|
| 10,706,766 | B2 * | 7/2020 | Kim | ...................... H01L 25/167 |
| 10,713,996 | B2 * | 7/2020 | Kim | ...................... H01L 27/156 |
| 11,100,840 | B2 * | 8/2021 | Kim | ......................... G09G 3/32 |
| 2020/0111403 | A1 * | 4/2020 | Kim | ......................... G09G 3/32 |

* cited by examiner

*Primary Examiner* — Vijay Shankar
(74) *Attorney, Agent, or Firm* — Nath, Goldberg & Meyer; Joshua B. Goldberg

(57) ABSTRACT

The present disclosure provides a pixel driving structure and a display panel. The pixel driving structure includes a pulse width modulation driving circuit, a pulse amplitude modulation driving circuit, and a buffer circuit. The pulse width modulation driving circuit is configured to control a pulse width of a driving current supplied to the light emitting device to be driven according to a pulse width modulation data voltage; the pulse amplitude modulation driving circuit is configured to control an amplitude of the driving current supplied to the light emitting device to be driven according to a pulse amplitude modulation data voltage; and the buffer circuit is electrically coupled between the pulse width modulation driving circuit and the pulse amplitude modulation driving circuit and is configured to adjust a rate at which the pulse width modulation driving circuit applies a pulse width modulation voltage to the pulse amplitude modulation driving circuit.

19 Claims, 3 Drawing Sheets

PIXEL DRIVING STRUCTURE AND DISPLAY PANEL

CROSS REFERENCE TO RELATED APPLICATIONS

This application claims priority to Chinese patent application No. 202011026398.8, filed at the Chinese intellectual property office on Sep. 25, 2020, the disclosure of which is incorporated herein by reference in its entirety.

TECHNICAL FIELD

The disclosure relates to the field of display technology, and particularly relates to a pixel driving structure and a display panel.

BACKGROUND

A display panel is provided with a plurality of pixel units arranged in an array, each pixel unit is provided with a plurality of sub-pixels, each sub-pixel is provided with a light emitting device and a pixel driving structure, the pixel driving structure is used for driving the light emitting device to emit light, and the pixel driving structure may include a pulse width modulation driving circuit and a pulse amplitude modulation driving circuit which respectively control a pulse width and an amplitude of a driving current provided by the pixel driving structure to the light emitting device to be driven.

SUMMARY

The present disclosure is directed to solve at least one of the technical problems in the related art, and provides a pixel driving structure capable of adjusting a rate at which a pulse width modulation driving circuit applies a pulse width modulation voltage to a pulse amplitude modulation driving circuit, so as to avoid a difficulty in controlling the luminance of a light emitting device due to a first driving transistor in the pulse amplitude modulation driving circuit being turned off under an excessively fast application rate of the pulse width modulation voltage.

In a first aspect, a technical solution for solving the technical problem of the present disclosure is a pixel driving structure, including:

a pulse width modulation driving circuit configured to control a pulse width of a driving current supplied to a light emitting device to be driven according to a pulse width modulation data voltage;

a pulse amplitude modulation driving circuit configured to control an amplitude of the driving current supplied to the light emitting device to be driven according to a pulse amplitude modulation data voltage;

a buffer circuit electrically coupled between the pulse width modulation driving circuit and the pulse amplitude modulation driving circuit for adjusting a rate at which the pulse width modulation driving circuit applies a pulse width modulation voltage to the pulse amplitude modulation driving circuit.

In pixel driving structure provided by the present disclosure, the buffer circuit is provided between the pulse width modulation driving circuit and the pulse amplitude modulation driving circuit for adjusting the rate at which the pulse width modulation driving circuit applies the pulse width modulation voltage to the pulse amplitude modulation driving circuit, and thus avoid a difficulty in controlling the luminance of the light emitting device due to the first driving transistor in the pulse amplitude modulation driving circuit being turned off under an excessively fast application rate of the pulse width modulation voltage.

In some implementations, the pulse amplitude modulation driving circuit includes a first driving transistor and a first storage capacitor; where, a first electrode of the first storage capacitor is electrically coupled with a first power voltage terminal, and a second electrode of the first storage capacitor is electrically coupled with a control electrode of the first driving transistor;

the buffer circuit includes a second storage capacitor, a first electrode of the second storage capacitor is electrically coupled with the pulse width modulation driving circuit, and a second electrode of the second storage capacitor is electrically coupled with the control electrode of the first driving transistor.

In some implementations, the pulse amplitude modulation driving circuit further includes: a first data writing sub-circuit, a first threshold compensation sub-circuit, a first reset sub-circuit and a first light emitting control sub-circuit; where, the first data writing sub-circuit is configured to transmit a pulse amplitude modulation data voltage to a first electrode of the first driving transistor in response to an amplitude modulation scan signal;

the first threshold compensation sub-circuit is configured to compensate for a threshold voltage of the first driving transistor in response to the amplitude modulation scan signal;

the first light emitting control sub-circuit is configured to transmit a first power voltage to the first driving transistor and output the driving current output from the first driving transistor to the light emitting device to be driven in response to a light emitting control signal;

the first reset sub-circuit is configured to reset the control electrode of the first driving transistor and the light emitting device to be driven by an initialization signal in response to a reset control signal.

In some implementations, the first data writing sub-circuit includes a first data writing transistor; where a first electrode of the first data writing transistor is electrically coupled with a pulse amplitude modulation data line, a second electrode of the first data writing transistor is electrically coupled with the first electrode of the first driving transistor, and a control electrode of the first data writing transistor is electrically coupled with an amplitude modulation scan signal line.

In some implementations, the first threshold compensation sub-circuit includes a first threshold compensation transistor, a first electrode of the first threshold compensation transistor is electrically coupled with the control electrode of the first driving transistor, a second electrode of the first threshold compensation transistor is electrically coupled with a second electrode of the first driving transistor, a control electrode of the first threshold compensation transistor is electrically coupled with an amplitude modulation scan signal line.

In some implementations, the first light emitting control sub-circuit includes a first light emitting control transistor and a second light emitting control transistor; where a first electrode of the first light emitting control transistor is electrically coupled with the first power voltage terminal, a second electrode of the first light emitting control transistor is electrically coupled with the first electrode of the first driving transistor, and a control electrode of the first light emitting control transistor is electrically coupled with a light emitting control signal line;

a first electrode of the second light emitting control transistor is electrically coupled with a second electrode of the first driving transistor, a second electrode of the second light emitting control transistor is electrically coupled with a first electrode of the light emitting device, and a control electrode of the second light emitting control transistor is electrically coupled with the light emitting control signal line.

In some implementations, the first reset sub-circuit includes a first reset transistor and a second reset transistor; where a first electrode of the first reset transistor is electrically coupled with the control electrode of the first driving transistor, a second electrode of the first reset transistor is electrically coupled with an initialization signal terminal, and a control electrode of the first reset transistor is electrically coupled with a reset control signal line;

a first electrode of the second reset transistor is electrically coupled with the initialization signal terminal, a second electrode of the second reset transistor is electrically coupled with a first electrode of the light emitting device, and a control electrode of the second reset transistor is electrically coupled to the reset control signal line.

In some implementations, the pulse width modulation driving circuit includes a second driving transistor and a third storage capacitor; where a first electrode of the third storage capacitor is electrically coupled with the first power voltage terminal, and a second electrode of the third storage capacitor is electrically coupled with the control electrode of the second driving transistor.

In some implementations, the pulse width modulation driving circuit further includes: a second data writing sub-circuit, a second threshold compensation sub-circuit, a second reset sub-circuit and a second light emitting control sub-circuit; where the second data writing sub-circuit is configured to transmit a pulse width modulation data voltage to a first electrode of the second driving transistor in response to a width modulation scan signal;

the second threshold compensation sub-circuit is configured to compensate for a threshold voltage of the second driving transistor in response to the width modulation scan signal;

the second light emitting control sub-circuit is configured to transmit a sweep frequency signal to the second driving transistor and output a pulse width modulation voltage output from the second driving transistor to the first electrode of the second storage capacitor in response to a light emitting control signal, the second reset sub-circuit is configured to reset the control electrode of the second driving transistor and the first electrode of the second storage capacitor by an initialization signal in response to a reset control signal.

In some implementations, the second data writing sub-circuit includes a second data writing transistor; where a first electrode of the second data writing transistor is electrically coupled with a pulse width modulation data line, a second electrode of the second data writing transistor is electrically coupled with the first electrode of the second driving transistor, and a control electrode of the second data writing transistor is electrically coupled with a width modulation scan signal line.

In some implementations, the second threshold compensation sub-circuit includes a second threshold compensation transistor, a first electrode of the second threshold compensation transistor is electrically coupled with the control electrode of the second driving transistor, a second electrode of the second threshold compensation transistor is electrically coupled with a second electrode of the second driving transistor, and a control electrode of the second threshold compensation transistor is electrically coupled with a width modulation scan signal line.

In some implementations, the second light emitting control sub-circuit includes a third light emitting control transistor and a fourth light emitting control transistor; where a first electrode of the third light emitting control transistor is electrically coupled with a sweep frequency signal line, a second electrode of the third light emitting control transistor is electrically coupled with the first electrode of the second driving transistor, and a control electrode of the third light emitting control transistor is electrically coupled with a light emitting control signal line;

a first electrode of the fourth light emitting control transistor is electrically coupled with a second electrode of the second driving transistor, a second electrode of the fourth light emitting control transistor is electrically coupled with the first electrode of the second storage capacitor, and a control electrode of the fourth light emitting control transistor is electrically coupled with the light emitting control signal line.

In some implementations, the second reset sub-circuit includes a third reset transistor and a fourth reset transistor; where a first electrode of the third reset transistor is electrically coupled with the control electrode of the second driving transistor, a second electrode of the third reset transistor is electrically coupled with an initialization signal terminal, and a control electrode of the third reset transistor is electrically coupled with a reset control signal line;

a first electrode of the fourth reset transistor is electrically coupled to the initialization signal terminal, a second electrode of the fourth reset transistor is electrically coupled to the first electrode of the second storage capacitor, and a control electrode of the fourth reset transistor is electrically coupled to the reset control signal line.

In some implementations, a ratio of a capacitance value of the first storage capacitor to a capacitance value of the second storage capacitor is between 1:1 and 2:1.

In a second aspect, the present disclosure further provides a display panel, including a substrate, and a plurality of pixel units arranged in an array on the substrate, each of the pixel units including a plurality of sub-pixels; and each of the sub-pixels includes the pixel driving structure described above.

DRAWINGS

DETAILED DESCRIPTION

Figure 1:
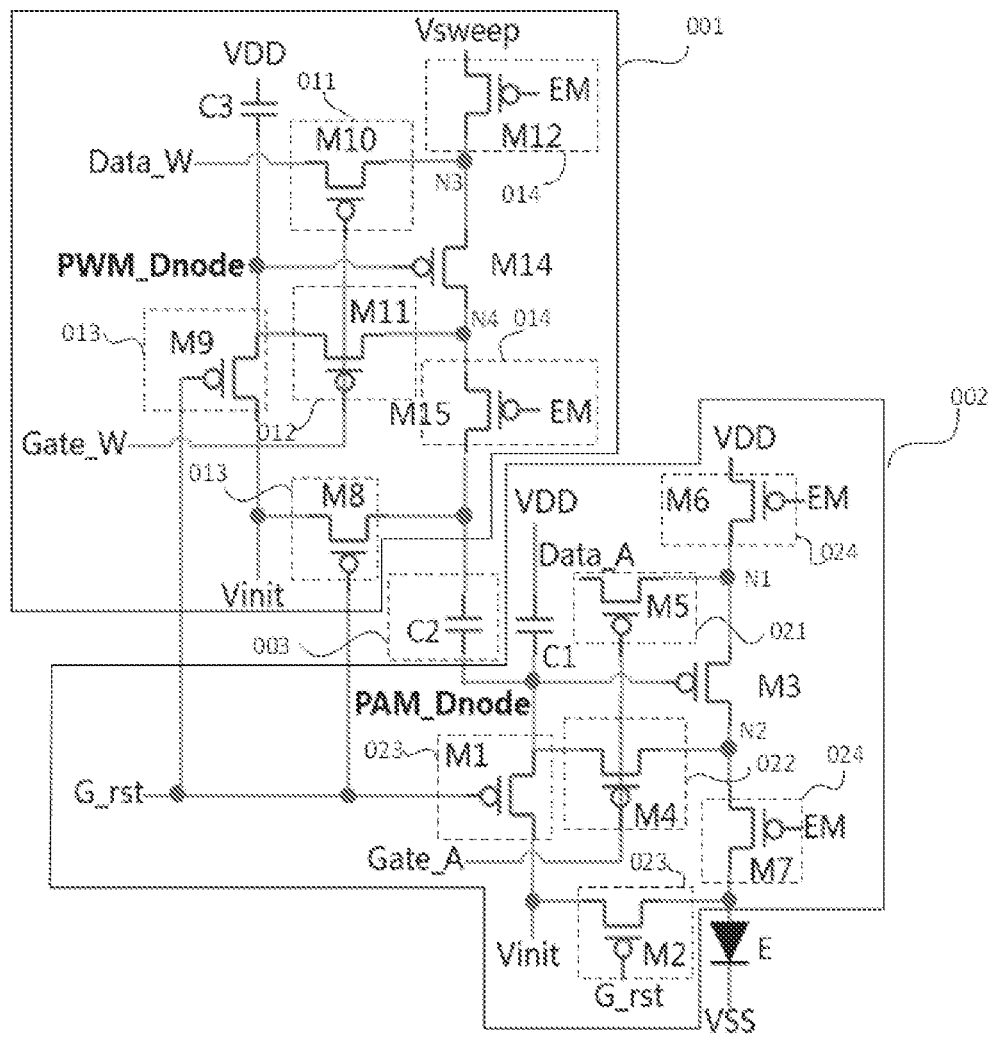
FIG. 1 is a schematic structural diagram of a pixel driving structure provided in an embodiment of the present disclosure.

In order that those skilled in the art will better understand the technical solutions of the present disclosure, the following detailed description is given with reference to the accompanying drawings and the specific implementations.

The shapes and sizes of the components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "include" or "comprise", and the like, means that the element or item preceding the word contains the element or item listed after the word and its equivalent, but does not exclude other elements or items. The terms "coupled" or "connected" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

It should be noted that, according to characteristics of the transistors, the transistors may be divided into N-type transistors and P-type transistors, and for clarity, the embodiments of the present disclosure detail the technical solutions of the present disclosure by taking the transistors being P-type transistors (for example, P-type MOS transistors) as an example. However, the transistors in the embodiments of the present disclosure are not limited to P-type transistors, and one skilled in the art may also implement the functions of one or more transistors in the embodiments of the present disclosure by using N-type transistors (e.g., N-type MOS transistors) according to actual needs.

In addition, the transistors used in the embodiments of the present disclosure may be thin film transistors or field effect transistors or other switching devices having the same characteristics, and the thin film transistors may include oxide semiconductor thin film transistors, amorphous silicon thin film transistors or polysilicon thin film transistors, and the like. For each transistor, it includes a first electrode, a second electrode and a control electrode; the control electrode is used as a gate of the transistor, one of the first electrode and the second electrode is used as a source of the transistor, and the other one is used as a drain of the transistor; the source and drain of the transistor may be symmetrical in structure, so that there may be no difference in physical structure therebetween. In the embodiments of the present disclosure, in order to distinguish transistors, except for a gate serving as the control electrode, the first electrode is directly described as the source, and the second electrode is directly described as the drain, so that the source and the drain of all or part of the transistors in the embodiments of the present disclosure may be interchanged as necessary. For convenience of explanation, the first electrode, the second electrode, and the control electrode of the transistor being the source, the drain, and the gate, respectively, is taken as an example for explanation.

Figure 3:
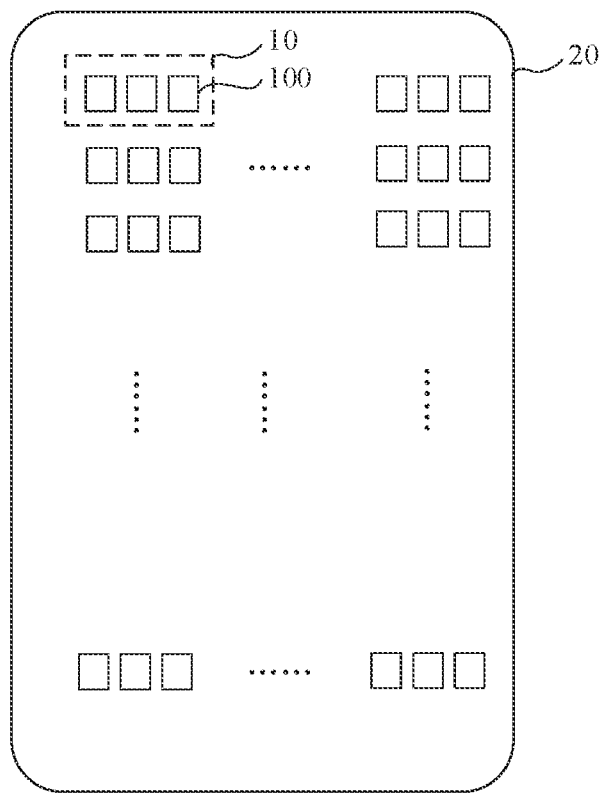
FIG. 3 is a schematic structural diagram of a display panel to which a pixel driving structure provided in an embodiment of the present disclosure is applied.

In a first aspect, as shown in FIG. 1 and FIG. 3, an embodiment of the present disclosure provides a pixel driving structure, which may be applied to a display panel, and referring to FIG. 3, taking a display panel 101 as an example, the display panel 101 may include a substrate 20, and a plurality of pixel units 10 arranged in an array on the substrate 20, each pixel unit 10 includes a plurality of sub-pixels 100, and each sub-pixel 100 has a light emitting device E and a pixel driving structure, and the pixel driving structure is configured to drive the light emitting device E to emit light. Referring to FIG. 1, the pixel driving structure provided in this embodiment includes a Pulse Width Modulation (PWM) driving circuit 001, a Pulse Amplitude Modulation (PAM) driving circuit 002, and a buffer circuit 003.

Specifically, the buffer circuit 003 is electrically coupled between the PWM driving circuit 001 and the PAM driving circuit 002, the PAM driving circuit 002 is coupled to the light emitting device E, and the pixel driving structure may perform pulse amplitude modulation and pulse width modulation driving on the light emitting device in order to control the color gradation of light emitted from the light emitting device E. The light emitting device E may emit light with different luminance according to the magnitude or pulse width of the driving current supplied from the pixel driving structure. Here, the pulse width of the driving current may be represented by a duty ratio of the driving current or a duration of the driving current.

In a case where the light emitting device E is driven only by the PAM driving method, the luminance performance of the light emitting device E at a low gray scale is poor, and thus the PWM driving method may be introduced to provide a certain amount of driving current to the light emitting device E and control the time duration of light emitting, so that the luminance performance of the light emitting device E at the low gray scale can be improved. The larger the magnitude of the driving current is, the higher the light emitting luminance of the light emitting device E is, and the larger the pulse width is (i.e., the higher the duty ratio or the longer the duration is), the higher the light emitting luminance of the light emitting device E is, but the present disclosure is not limited thereto. The PWM driving circuit 001 is configured to control the pulse width of the driving current supplied to the light emitting device E to be driven according to the pulse width modulation data voltage Data_W, the PAM driving circuit 002 is configured to control the amplitude of the driving current supplied to the light emitting device E to be driven according to the pulse amplitude modulation data voltage Data_A, that is, the pulse width of the driving current finally used by the PAM driving circuit 002 to drive the light emitting device E is identical to the pulse width of the pulse width modulation data voltage Data_W received by the PWM driving circuit 001, and the amplitude of the driving current output by the PAM driving circuit 002 to the light emitting device E is identical to the amplitude of the pulse amplitude modulation data voltage Data_A received by the PAM driving circuit 002.

Further, the PWM driving circuit 001 outputs a pulse width modulation voltage to the PAM driving circuit 002 according to the pulse width modulation data voltage Data_W, and the PAM driving circuit 002 outputs a driving current related to the pulse amplitude modulation data voltage Data_A to the light emitting device E under the control of the pulse width modulation voltage. The buffer circuit 003 is coupled between the PWM driving circuit 001 and the PAM driving circuit 002, and the buffer circuit 003 is used to adjust a rate at which the PWM driving circuit 001 applies the pulse width modulation voltage to the PAM driving circuit 002.

The PAM driving circuit 002 has a first driving transistor M3, a source of the first driving transistor M3 is coupled to a first power voltage terminal to receive a first power voltage VDD, and a pulse width modulation voltage output by the PWM driving circuit 001 is applied to a gate of the first driving transistor M3, and if a rate of applying the pulse width modulation voltage from the PWM driving circuit 001 to the gate of the first driving transistor M3 is too fast, a gate voltage of the first driving transistor M3 is caused to rise fast, so that a voltage difference between the gate and the source of the first driving transistor M3 is insufficient, and the first driving transistor M3 is turned off quickly, so that it is difficult to control luminance of the light emitting device E by the first driving transistor M3 accurately. For the pixel driving structure provided by the embodiment, because the buffer circuit 003 is arranged between the PWM driving circuit 001 and the PAM driving circuit 002, the buffer circuit 003 can adjust the rate of applying the pulse width modulation voltage from the PWM driving circuit 001 to the PAM driving circuit 002, so that the situation that the first driving transistor M3 in the PAM driving circuit 002 is turned off due to the excessively fast speed of applying the pulse width modulation voltage from the PWM driving circuit 001 to the PAM driving circuit 002, which leads to difficulty in accurately controlling the luminance of the light emitting device E, can be avoided.

Further, with continued reference to FIG. 1, the PAM driving circuit 002 includes the first driving transistor M3 described above, and may further include a first storage capacitor C1. A first electrode of the first storage capacitor C1 is electrically coupled to the first power voltage terminal, the first power voltage terminal is used for providing the first power voltage VDD, and a second electrode of the first storage capacitor C1 is electrically coupled to the gate of the first driving transistor M3.

In the pixel driving structure provided in this embodiment, the buffer circuit 003 includes a second storage capacitor C2, a first electrode of the second storage capacitor C2 is electrically coupled to the PWM driving circuit 001, a second electrode of the second storage capacitor C2 is electrically coupled to the gate of the first driving transistor M3 of the PAM driving circuit 002, and the second electrode of the second storage capacitor C2 is further coupled to the second electrode of the first storage capacitor C1. Certainly, the buffer circuit 003 is not limited to including only the second storage capacitor C2.

According to the above, the first electrode of the second storage capacitor C2 receives the pulse width modulation voltage inputted from the PWM driving circuit 001, and slowly transmits the pulse width modulation voltage to the gate of the first driving transistor M3, so as to ensure that the first driving transistor M3 is stably turned on during a light emitting stage, thereby accurately controlling the light emitting device E.

Specifically, when the buffer circuit 003 including the second storage capacitor C2 is not provided, a voltage of a gate node PAM_Dnode changes instantaneously with the pulse width modulation voltage; and the magnitude of the driving current for driving the light emitting device E to emit light satisfies the equation I=β(Vgs−Vth)², where, $$\beta = \frac{1}{2}\mu_n C_{ox}\left(\frac{W}{L}\right),$$

$\mu_n$ is an electron mobility of the first driving transistor M3, $C_{ox}$ is an insulating capacitance per unit area, and $$\frac{W}{L}$$

is an aspect ratio of the first driving transistor M3. Ideally, in the light emitting stage of the light emitting device E, the amplitude of the received driving current should be stable and constant, and if the voltage of the gate node PAM_Dnode changes in the light emitting stage, the voltage difference between the gate and the source of the first driving transistor M3 may change, which may further cause the state of the first driving transistor M3 being turned on to be unstable, that is, the time duration of the first driving transistor M3 being turned on is insufficient, so that it is difficult to accurately control the light emitting device E. In some cases, the capacitance of the first storage capacitor C1 may be designed to be larger to stabilize the voltage of the gate node PAM_Dnode during the light emitting stage. However, for example, the capacitance of the first storage capacitor C1 needs to reach 200p to achieve the desired effect, and it takes a large space of the display panel for the design.

In the embodiment provided by the present application, by providing the buffer circuit 003 including the second storage capacitance C2, and adjusting a ratio of capacitances of the first storage capacitors C1 and the second storage capacitor C2, the voltage of the gate node PAM_Dnode can be adjusted, the gate node PAM_Dnode is a connection node between the second electrode of the first storage capacitor C1, the second electrode of the second storage capacitor C2, and the gate of the first driving transistor M3, and the gate node PAM_Dnode determines the gate voltage of the first driving transistor M3, thus ensuring the voltage of the gate node PAM_Dnode to be stable enables the driving current output by the first driving transistor M3 to be stable, further, the light emitting luminance of the light emitting device E is controlled, so that gray scale display can be more accurate, and the influence of the pulse width modulation voltage output by the PWM driving circuit 001 on the voltage of the gate node PAM_Dnode can be reduced by adjusting the capacitance of the second storage capacitor C2. For example, the second storage capacitor C2 is mainly affected by the pulse width modulation voltage output by the PWM driving circuit 001 according to the pulse width modulation data voltage Data_W, and if the capacitance of the second storage capacitor C2 is relatively larger than that of the first storage capacitor C1, the pulse width modulation data voltage Data_W has a larger influence on the driving current of the first driving transistor M3. Specifically, the ratio of the capacitance of the first storage capacitor C1 to the capacitance of the second storage capacitor C2 may be between 1:1 and 2:1, which is not limited herein. The voltage of the gate node PAM_Dnode is adjusted by adjusting the ratio of the capacitance of the first storage capacitor C1 to the capacitance of the second storage capacitor C2, so that the influence of the driving current output by the first driving transistor M3 on the light emitting device E can be adjusted, and the gray scale display of the light emitting device E is more accurate. In addition, in a light emitting control stage, a sweep frequency signal Vsweep for controlling the light emitting time duration of the light emitting device E is loaded to the second storage capacitor C2 by the PWM driving circuit 001, and then the second storage capacitor C2 slowly transfers the sweep frequency signal Vsweep to the gate node PAM_Dnode of the first driving transistor M3, so that the light emitting time duration of the light emitting device E can be controlled in the light emitting control stage by adjusting the capacitance of the second storage capacitor C2, and the control of the light emitting time duration is more accurate, and the detailed contents of the light emitting control stage will be described later.

Further, when the sweep signal Vsweep is 0, the voltage Vpam of the gate node PAM_Dnode satisfies:

$$Vpam = \frac{C1}{C1 + C2} \times VDD,$$

where, C1 is the capacitance of the first storage capacitor, C2 is the capacitance of the second storage capacitor, and VDD is the voltage value of the first power voltage outputted from the first power voltage terminal.

According to the capacitance formula $C=\varepsilon \times \varepsilon_0 \times S/d$; $\varepsilon$ is a dielectric constant of material of an insulating layer of the capacitor, $\varepsilon_0$ is a vacuum dielectric constant, S is an area of the capacitor, and d is a thickness of the insulating layer of the capacitor. Therefore, the capacitance of the first storage capacitor C1 or the second storage capacitor C2 can be determined by adjusting $\varepsilon$, $\varepsilon_0$, S, d.

In some implementations, referring to FIG. 1, in the pixel driving structure provided in this embodiment, the PAM driving circuit 002 further includes a first data writing sub-circuit 021, a first threshold compensation sub-circuit 022, a first reset sub-circuit 023, and a first light emitting control sub-circuit 024. The first data writing sub-circuit 021 is configured to transmit a pulse amplitude modulation data voltage Data_A to the source of the first driving transistor M3 in response to an amplitude modulation scan signal Gate_A; the first threshold compensation sub-circuit 022 is configured to compensate for a threshold voltage Vth of the first driving transistor M3 in response to the amplitude modulation scan signal Gate_A; the first light emitting control sub-circuit 024 is configured to transmit the first power voltage VDD to the first driving transistor M3 and output a driving current output from the first driving transistor M3 to the light emitting device E to be driven in response to a light emitting control signal EM; the first reset sub-circuit 023 is configured to reset the gate of the first driving transistor M3 and the first electrode of the light emitting device E to be driven by an initialization signal Vinit in response to a reset control signal G_rst, and the second electrode of the light emitting device E is coupled to a second power voltage terminal to receive a second power voltage VSS inputted from the second power voltage terminal.

It should be noted that one of the first power voltage terminal and the second power voltage terminal is a high voltage terminal and the other is a low voltage terminal, for example, the first power voltage VDD provided by the first power voltage terminal is a high voltage, and the second power voltage VSS provided by the second power voltage terminal is a low voltage, i.e., VDD>VSS.

In some implementations, referring to FIG. 1, in the pixel driving structure provided in this embodiment, the first data writing sub-circuit 021 includes a first data writing transistor M5. A source of the first data writing transistor M5 is electrically coupled to a pulse amplitude modulation data line for receiving the pulse amplitude modulation data voltage Data_A input from the pulse amplitude modulation data line; a drain of the first data writing transistor M5 is electrically coupled to the source of the first driving transistor M3; a gate of the first data writing transistor M5 is electrically coupled to an amplitude modulation scan signal line for receiving the amplitude modulation scan signal Gate_A inputted from the amplitude modulation scan signal line. Certainly, the first data writing sub-circuit 021 is not limited to including only the first data writing transistor M5.

In some implementations, referring to FIG. 1, in the pixel driving structure provided in this embodiment, the first threshold compensation sub-circuit 022 includes a first threshold compensation transistor M4, a source of the first threshold compensation transistor M4 is electrically coupled to the gate of the first driving transistor M3, a drain of the first threshold compensation transistor M4 is electrically coupled to the drain of the first driving transistor M3, a gate of the first threshold compensation transistor M4 is electrically coupled to the amplitude modulation scan signal line for receiving the amplitude modulation scan signal Gate_A inputted from the amplitude modulation scan signal line, and the first threshold compensation transistor M4 compensates the threshold voltage of the first driving transistor M3 in response to the amplitude modulation scan signal Gate_A.

In some implementations, referring to FIG. 1, in the pixel driving structure provided in this embodiment, the first light emitting control sub-circuit 024 includes a first light emitting control transistor M6 and a second light emitting control transistor M7. A source of the first light emitting control transistor M6 is electrically coupled to the first power voltage terminal for receiving the first power voltage VDD input from the first power voltage terminal, a drain of the first light emitting control transistor M6 is electrically coupled to the source of the first driving transistor M3, and a gate of the first light emitting control transistor M6 is electrically coupled to a light emitting control signal line for receiving the light emitting control signal EM provided by the light emitting control signal line; a source of the second light emitting control transistor M7 is electrically coupled to the drain of the first driving transistor M3, a drain of the second light emitting control transistor M7 is electrically coupled to the light emitting device E, and a gate of the second light emitting control transistor M7 is electrically coupled to the light emitting control signal line for receiving the light emitting control signal EM supplied from the light emitting control signal line.

It should be noted that the light emitting control signal EM received by the first light emitting control transistor M6 and the light emitting control signal EM received by the second light emitting control transistor M7 may be the same or different, that is, the gate of the first light emitting control transistor M6 and the gate of the second light emitting control transistor M7 may be electrically coupled to the same light emitting control signal line, or may be coupled to different light emitting control signal lines, in this case, if the gate of the first light emitting control transistor M6 and the gate of the second light emitting control transistor M7 are electrically coupled to the same light emitting control signal line, the display panel may be provided with only one light emitting control signal line, so that the number of light emitting control signal lines is reduced. If the gate of the first light emitting control transistor M6 and the gate of the second light emitting control transistor M7 are electrically coupled to two light emitting control signal lines, the light emitting control signals transmitted in the two light emitting control signal lines are the same.

It should be noted that, in a case where the first light emitting control transistor M6 and the second light emitting control transistor M7 are different types of transistors, for example, the first light emitting control transistor M6 is a P-type transistor, and the second light emitting control transistor M7 is an N-type transistor, the light emitting control signal received by the first light emitting control transistor M6 and the light emitting control signal received by the second light emitting control transistor M7 may be different, and the embodiment of the disclosure is not limited thereto.

In some implementations, referring to FIG. 1, in the pixel driving structure provided in this embodiment, the first reset sub-circuit 023 may include a first reset transistor M1 and a second reset transistor M2. A source of the first reset transistor M1 is electrically coupled to the gate of the first driving transistor M3, a drain of the first reset transistor M1 is electrically coupled to an initialization signal terminal for receiving an initialization signal Vinit provided by the initialization signal terminal, a gate of the first reset transistor M1 is electrically coupled to a reset control signal line for receiving a reset control signal G_rst provided by the reset control signal line, and the first reset transistor M1 resets the voltage of the gate of the first driving transistor M3 to the voltage of the initialization signal Vinit in response to the reset control signal G_rst in a reset stage; a source of the second reset transistor M2 is electrically coupled to the initialization signal terminal for receiving the initialization signal Vinit provided by the initialization signal terminal, a drain of the second reset transistor M2 is electrically coupled to the first electrode of the light emitting device E, a gate of the second reset transistor M2 is electrically coupled to the reset control signal line for receiving the reset control signal G_rst provided by the reset control signal line, and the second reset transistor M2 resets the voltage of the first electrode of the light emitting device E to the voltage of the initialization signal Vinit in response to the reset control signal G_rst during the reset stage.

It should be noted that the reset control signal G_rst received by the first reset transistor M1 and the reset control signal G_rst received by the second reset transistor M2 may be the same or different, that is, the gate of the first reset transistor M1 and the gate of the second reset transistor M2 may be electrically coupled to the same reset control signal line, or may be coupled to different reset control signal lines, and in this case, if the gate of the first reset transistor M1 and the gate of the second reset transistor M2 are electrically coupled to the same reset control signal line, the display panel may be provided with only one reset control signal line, so as to reduce the number of reset control signal lines. If the gate of the first reset transistor M1 and the gate of the second reset transistor M2 are electrically coupled to two reset control signal lines, the reset control signals transmitted in the reset control signal lines are the same.

It should be noted that, when the first reset transistor M1 and the second reset transistor M2 are different types of transistors, for example, the first reset transistor M1 is a P-type transistor, and the second reset transistor M2 is an N-type transistor, the reset control signal received by the first reset transistor M1 and the reset control signal received by the second reset transistor M2 may be different, which is not limited in the embodiment of the disclosure.

Further, with continued reference to FIG. 1, the PWM driving circuit 001 may have a circuit structure similar to that of the PAM driving circuit 002, and for example, the PWM driving circuit 001 may include a second driving transistor M14 and a third storage capacitor C3. A first electrode of the third storage capacitor C3 is electrically coupled to the first power voltage terminal, the first power voltage terminal is used for providing the first power voltage VDD, and a second electrode of the third storage capacitor C3 is electrically coupled to a gate of the second driving transistor M14.

Further, referring to FIG. 1, in the pixel driving structure provided in the present embodiment, the PWM driving circuit 001 further includes a second data writing sub-circuit 011, a second threshold value compensation sub-circuit 012, a second reset sub-circuit 013, and a second light emitting control sub-circuit 014. The second data writing sub-circuit 011 is configured to transmit the pulse width modulation data voltage Data_W to a source of the second driving transistor M14 in response to the width modulation scan signal Gate_W; the second threshold compensation sub-circuit 012 is configured to compensate for a threshold voltage of the second driving transistor M14 in response to the width modulation scan signal Gate_W; the second light emitting control sub-circuit 014 is configured to transmit, in response to the light emitting control signal EM, the sweep signal Vsweep to the source of the second driving transistor M14, and output, in response to the light emitting control signal EM, the pulse width modulation voltage output by the second driving transistor M14 according to the pulse width modulation data voltage Data_W, to the first electrode of the second storage capacitor C2 of the buffer circuit 003; the second reset sub-circuit 013 is configured to reset the gate of the second driving transistor M14 and the first electrode of the second storage capacitor C2 by the initialization signal Vinit in response to the reset control signal G_rst.

In some implementations, referring to FIG. 1, in the pixel driving structure provided in the present embodiment, the second data writing sub-circuit 011 includes a second data writing transistor M10. A source of the second data writing transistor M10 is electrically coupled to the pulse width modulation data line, and receives a pulse width modulation data voltage Data_W input from the pulse width modulation data line; a drain of the second data writing transistor M10 is electrically coupled to the source of the second driving transistor M14, and a gate of the second data writing transistor M10 is electrically coupled to the width modulation scan signal line for receiving the width modulation scan signal Gate_W input from the width modulation scan signal line. Certainly, the second data writing sub-circuit 011 is not limited to including only the second data writing transistor M10.

In some implementations, referring to FIG. 1, in the pixel driving structure provided in this embodiment, the second threshold compensation sub-circuit 012 includes a second threshold compensation transistor M11, a source of the second threshold compensation transistor M11 is electrically coupled to the gate of the second driving transistor M14, a drain of the second threshold compensation transistor M11 is electrically coupled to the drain of the second driving transistor M14, a gate of the second threshold compensation transistor M11 is electrically coupled to the width modulation scan signal line for receiving the width modulation scan signal Gate_W inputted by the width modulation scan signal line, and the second threshold compensation transistor M11 compensates the threshold voltage of the second driving transistor M14 in response to the width modulation scan signal Gate_W.

It should be noted that the width modulation scan signal Gate_W and the amplitude modulation scan signal Gate_A may be the same scan signal or different scan signals, and may be input by one scan signal line or different scan signal lines, and the width modulation scan signal Gate_W and the amplitude modulation scan signal Gate_A may be input to the PWM driving circuit 001 and the PAM driving circuit 002 simultaneously or may be input in a time-sharing manner, which is not limited herein.

In some implementations, referring to FIG. 1, in the pixel driving structure provided in this embodiment, the second light emitting control sub-circuit 014 includes a third light emitting control transistor M12 and a fourth light emitting control transistor M15. A source of the third light emitting control transistor M12 is electrically coupled to the sweep frequency signal line for receiving the sweep frequency signal Vsweep provided by the sweep frequency signal line, a drain of the third light emitting control transistor M12 is electrically coupled to the source of the second driving transistor M14, and a gate of the third light emitting control transistor M12 is electrically coupled to the light emitting control signal line for receiving the light emitting control signal EM provided by the light emitting control signal line; a source of the fourth light emitting control transistor M15 is electrically coupled to the drain of the second driving transistor M14, a drain of the fourth light emitting control transistor M15 is electrically coupled to the first electrode of the second storage capacitor C2 of the buffer circuit 003, and a gate of the fourth light emitting control transistor M15 is electrically coupled to the light emitting control signal line for receiving the light emitting control signal EM supplied from the light emitting control signal line. In the light emitting control stage, the sweep frequency signal Vsweep is loaded to the second storage capacitor C2 through the third light emitting control transistor M12, the second driving transistor M14 and the fourth light emitting control transistor M15 sequentially, and then the voltage of the gate node PAM_Dnode is gradually increased by the voltage coupling of the second storage capacitor C2 and the first storage capacitor C1 until the first driving transistor M3 is turned off, so that the light emitting device E stops emitting light and ends the light emitting control stage.

It should be noted that the light emitting control signal EM received by the third light emitting control transistor M12 and the light emitting control signal EM received by the fourth light emitting control transistor M15 may be the same or different, that is, the gate of the third light emitting control transistor M12 and the gate of the fourth light emitting control transistor M15 may be electrically coupled to the same light emitting control signal line or different light emitting control signal lines. In this case, if the gate of the third light emitting control transistor M12 and the gate of the fourth light emitting control transistor M15 are electrically coupled to the same light emitting control signal line, the display panel may be provided with only one light emitting control signal line to reduce the number of light emitting control signal lines. If the gate of the third light emitting control transistor M12 and the gate of the fourth light emitting control transistor M15 are electrically coupled to two light emitting control signal lines, the light emitting control signals transmitted in the two light emitting control signal lines are the same.

It should be noted that, when the third light emitting control transistor M12 and the fourth light emitting control transistor M15 are different types of transistors, for example, the third light emitting control transistor M12 is a P-type transistor, and the fourth light emitting control transistor M15 is an N-type transistor, the light emitting control signal received by the third light emitting control transistor M12 is different from the light emitting control signal received by the fourth light emitting control transistor M15, which is not limited in this embodiment of the disclosure.

In some implementations, referring to FIG. 1, in the pixel driving structure provided in this embodiment, the second reset sub-circuit 013 may include a third reset transistor M9 and a fourth reset transistor M8. A source of the third reset transistor M9 is electrically coupled to the gate of the second driving transistor M14, a drain of the third reset transistor M9 is electrically coupled to the initialization signal terminal for receiving the initialization signal Vinit provided by the initialization signal terminal, a gate of the third reset transistor M9 is electrically coupled to the reset control signal line for receiving the reset control signal G_rst provided by the reset control signal line, and in a reset stage, the third reset transistor M9 resets the voltage of the gate of the second driving transistor M14 to the voltage of the initialization signal Vinit in response to the reset control signal G_rst; a source of the fourth reset transistor M8 is electrically coupled to the initialization signal terminal for receiving the initialization signal Vinit provided by the initialization signal terminal, a drain of the fourth reset transistor M8 is electrically coupled to the first electrode of the second storage capacitor C2, a gate of the fourth reset transistor M8 is electrically coupled to the reset control signal line for receiving the reset control signal G_rst provided by the reset control signal line, and the fourth reset transistor M8 sets the voltage of the first electrode of the second storage capacitor C2 to the voltage of the initialization signal Vinit in response to the reset control signal G_rst in the reset stage.

It should be noted that the reset control signal G_rst received by the third reset transistor M9 and the reset control signal G_rst received by the fourth reset transistor M8 may be the same or different, that is, the gate of the third reset transistor M9 and the gate of the fourth reset transistor M8 may be electrically coupled to the same reset control signal line, or may be coupled to different reset control signal lines, and in this case, if the gate of the third reset transistor M9 and the gate of the fourth reset transistor M8 are electrically coupled to the same reset control signal line, the display panel may be provided with only one reset control signal line, so as to reduce the number of reset control signal lines. If the gate of the third reset transistor M9 and the gate of the fourth reset transistor M8 are electrically coupled to two reset control signal lines, the light emitting control signals transmitted in the reset light emitting control signal lines may be the same.

It should be noted that, when the third reset transistor M9 and the fourth reset transistor M8 are different types of transistors, for example, the third reset transistor M9 is a P-type transistor, and the fourth reset transistor M8 is an N-type transistor, the reset control signal received by the third reset transistor M9 and the reset control signal received by the fourth reset transistor M8 may be different, which is not limited in the embodiment of the disclosure.

Figure 2:
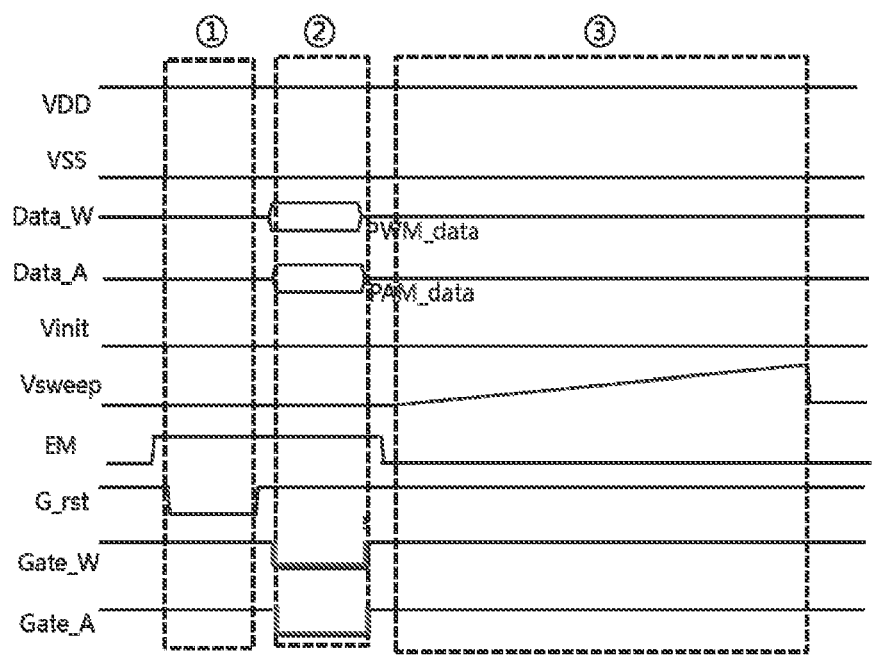
FIG. 2 is a timing diagram of signals in a pixel driving circuit provided in an embodiment of the present disclosure.

In order to make the implementation of the pixel circuit in this embodiment clearer, an operation process of the pixel circuit is described with reference to FIG. 1 and FIG. 2. The timing chart of FIG. 2 includes three stages, i.e., a T1 stage (shown as ①), a T2 stage (shown as ②), and a T3 stage (shown as ③), and FIG. 2 illustrates timings of the first power voltage VDD, the second power voltage VSS, the pulse width modulation data voltage Data_W, the pulse amplitude modulation data voltage Data_A, the initialization signal Vinit, the sweep frequency signal Vsweep, the light emitting control signal EM, the reset control signal G_rst, the width modulation scan signal Gate_W, and the amplitude modulation scan signal Gate_A in the three stages.

In the stage T1, that is, the reset stage (or an initialization stage), the reset control signal G_rst is written into the reset signal terminal, the reset control signal G_rst being a low-level signal, the first reset transistor M1 and the second reset transistor M2 in the PAM driving circuit 002 are turned on, and the initialization signal Vinit is written into the gate of the first driving transistor M3 and the first electrode of the light emitting device E to be driven, thereby resetting the gate of the first driving transistor M3 and the first electrode of the light emitting device E to be driven. In such case, the third reset transistor M9 and the fourth reset transistor M8 in the PWM driving circuit 001 are also turned on, and the initialization signal Vinit is written into the gate of the second driving transistor M14 and the first electrode of the second storage capacitor C2 of the buffer circuit 003, and the gate of the second driving transistor M14 and the first electrode of the second storage capacitor C2 are reset.

In the stage T2, that is, a data writing and threshold voltage extracting stage, the amplitude modulation scan signal Gate_A is written into the amplitude modulation scan signal line, the width modulation scan signal Gate_W is written into the width modulation scan signal line, the amplitude modulation scan signal Gate_A and the width modulation scan signal Gate_W are low-level signals, in response to the amplitude modulation scan signal Gate_A, the first data writing transistor M5 and the first threshold compensation transistor M4 in the PAM driving circuit 002 are turned on, and since the first threshold compensation transistor M4 is turned on, the threshold compensation is performed on the voltages of the gate and the drain of the first driving transistor M3, so that the voltage of the gate node PAM_Dnode of the first driving transistor M3 is equal to the voltage of the drain node N2 of the first driving transistor M3. Meanwhile, the pulse amplitude modulation data line writes the pulse amplitude modulation data voltage Data_A into the source node N1 of the first driving transistor M3 through the first data writing transistor M5, and the voltage of the gate node PAM_Dnode of the first driving transistor M3 is VDD-Data_A (i.e., PAM_data in FIG. 2). Similarly, in response to the width modulation scan signal Gate_W, the second data writing transistor M10 and the second threshold compensation transistor M11 in the PWM driving circuit 001 are turned on, and since the second threshold compensation transistor M11 is turned on, the threshold compensation is performed on the voltages of the gate and the drain of the second driving transistor M14, so that the voltage of the gate node PWM_Dnode (i.e., the second node) of the second driving transistor M14 is equal to the voltage of the drain node N4 of the second driving transistor M14. Meanwhile, the pulse width modulation data line writes the pulse width modulation data voltage Data_W into the source node N3 of the second driving transistor M14 through the second data writing transistor M10, and the voltage of the gate node PWM_Dnode of the second driving transistor M14 is (VDD-PWM_data). It should be noted that, since the data voltages Data_W and Data_A each are not a fixed voltage value in the stage T2, that is, the data voltages written at different times may be not the same, they are represented by rectangles in FIG. 2, that is, the data voltages Data_W and Data_A may range from a high level to a low level.

In the stage T3, that is, the light emitting stage, the light emitting control signal EM is written into the light emitting control signal terminal, the light emitting control signal is a low-level signal, the first light emitting control transistor M6 and the second light emitting control transistor M7 in the PAM driving circuit 002 are turned on, the third light emitting control transistor M12 and the fourth light emitting control transistor M15 in the PWM driving circuit 001 are turned on, the pulse width modulation voltage output by the PWM driving circuit 001 is applied to the gate node PAM_Dnode of the first driving transistor M3 of the PAM driving circuit 002, and the first driving transistor M3 outputs a driving current to the light emitting device E through the second light emitting control transistor M7 according to the pulse width modulation voltage and the pulse amplitude modulation voltage to drive the light emitting device E to emit light. Meanwhile, the voltage of the sweep frequency signal Vsweep loaded at the source of the third light emitting control transistor M12 of the PWM driving signal 001 is slowly increased, the sweep frequency signal Vsweep is loaded to the second storage capacitor C2 through the third light emitting control transistor M12, the second driving transistor M14 and the fourth light emitting control transistor M15, the second storage capacitor C2 gradually transfers the voltage to the gate node PAM_Dnode of the first driving transistor M3, and the rate of applying the voltage from the second storage capacitor C2 to the gate node PAM_Dnode of the first driving transistor M3 can be adjusted by adjusting the capacitance of the second storage capacitor C2, so that the voltage of the gate node PAM_Dnode is slowly increased, and the first driving transistor M3 coupled to the gate node PAM_Dnode is prevented from being turned off due to the voltage of the gate node PAM_Dnode being abruptly increased. As the sweep frequency signal Vsweep slowly increases, the voltage of the gate node PAM_Dnode also slowly increases, and when the voltage of the gate node PAM_Dnode increases to be equal to the voltage of the source node N1, the first driving transistor M3 is turned off, so that the light emitting device E stops emitting light, that is, the sweep frequency signal Vsweep can slowly increase to turn off the first driving transistor M3, and the second storage capacitor C2 can adjust the rate at which the voltage applied by the sweep signal Vsweep is transmitted to the gate node PAM_Dnode, and the time of the first driving transistor M3 to be turned off can be accurately controlled by the sweep frequency signal Vsweep and the second storage capacitor C2, so that the light emitting time duration of the light emitting device E can be controlled.

It is understood that the sweep frequency signal Vsweep is a voltage signal that changes with time, for example, the voltage value gradually increases with time, or the voltage first increases and then decreases with time, and specifically, may be a ramp signal or a triangular wave or sawtooth wave signal. Further, by designing the slope of the sweep frequency signal Vsweep, the light emitting device E can be controlled to achieve different light emitting time durations.

In summary, the pixel driving structure is realized in which the pulse width of the driving current is modulated by the PWM driving circuit 001 and the amplitude of the driving current is modulated by the PAM driving circuit 002 to control the driving current of the light emitting device E in the light emitting stage. In some examples, if it is only necessary to drive the light emitting device E with the PAM driving circuit 002, the voltage value of the pulse width modulation data voltage Data_W inputted to the second data writing transistor M10 of the PWM driving circuit 001 may be made to be equal (or approximately equal) to the voltage value input to the gate node PWM_Dnode of the second driving transistor M14, taking the pixel driving structure of FIG. 1 as an example, that is, the voltage value of the pulse width modulation data voltage Data_W may be made to be equal to (or approximately equal to) VDD, since the second data writing transistor M10 writes the pulse width modulated data voltage Data_W into the source node N3 of the second driving transistor M14, thereby the voltage of the gate of the second driving transistor M14 is equal (or approximately equal) to the voltage of the source of the second driving transistor M14, further, the second driving transistor M14 is turned off, so the voltage of the gate node PAM_Dnode of the first driving transistor M3 is not affected by the sweep frequency signal Vsweep at all, and the light emitting device E emits light only according to the driving current of the PAM driving circuit 002.

Further, taking the display panel 101 as an example, the display panel 101 may include a substrate 20, and a plurality of pixel units 10 arranged in an array on the substrate 20, each pixel unit 10 including a plurality of sub-pixels 100, each sub-pixel 100 having a light emitting device and a pixel driving structure therein, the pixel driving structure is configured to drive the light emitting device to emit light. The display panel further includes a plurality of scan signal lines, a plurality of data lines, a plurality of reset signal lines, a plurality of power voltage lines, a plurality of light emitting control signal lines, and a plurality of initialization power supply signal lines (none of which is shown in drawings), where the data lines and the power voltage lines extend in a column direction of the sub-pixels 100 arranged in an array, and the plurality of scan signal lines, the reset signal lines, the light emitting control signal lines, and the initialization power supply signal lines extend in a row direction of the sub-pixels 100 arranged in the array. It should be noted that the scan signal lines include a amplitude modulation scan signal line and a width modulation scan signal line, and the amplitude modulation scan signal line and the width modulation scan signal line may be the same scan signal line or different scan signal lines, and the pulse amplitude modulation scan signal line and the width modulation scan signal line being the same scan signal line is taken as an example for description here. The data lines include a pulse amplitude modulation data line and a pulse width modulation data line, which may be the same data line or different data lines, and the pulse width modulation data line and the pulse width modulation data line being the same data line is taken as an example for illustration here. Each data line is coupled to a column of sub-pixels 100, and provides data voltages (e.g., Data_A and Data_W) to the pixel driving structures of the column of sub-pixels 100; each power voltage line is coupled with a column of sub-pixels 100, the power voltage line is coupled with the first power voltage terminal to provide the first power voltage VDD to the pixel driving structures of the column of sub-pixels 100; each scan signal line is coupled with a row of sub-pixels 100, and provides scan signals (such as Gate_A and Gate_W) for the row of sub-pixels 100; each light emitting control signal line is coupled to a row of sub-pixels 100 and provides a light emitting control signal EM to the row of sub-pixels 100; each reset signal line is coupled with a row of sub-pixels 100 and provides a reset control signal G_rst for the row of sub-pixels 100; each initialization power supply signal line is coupled to a row of sub-pixels 100, and the initialization power supply signal line is coupled to the initialization signal terminal to provide the initialization signal Vinit to the row of sub-pixels 100. Certainly, the structure of the display panel is not limited thereto, and the arrangement of the signal lines and the signal lines included in the display panel are also not limited thereto, and the display panel is only taken as an example here, and the disclosure is not limited thereto.

In a second aspect, referring to FIG. 3, the present embodiment further provides a display panel, taking the display panel 101 as an example, the display panel 101 may include a substrate 20, and a plurality of pixel units 10 arranged in an array on the substrate 20, each pixel unit 10 includes a plurality of sub-pixels 100, and each sub-pixel 100 has a light emitting device and a pixel driving structure therein, and the pixel driving structure is used for driving the light emitting device to emit light.

In some implementations, the sub-pixels 100 may be of multiple kinds according to the color of light emitted by the light emitting devices. For example, the light emitting devices may include a red (R) light emitting device emitting red light, a green (G) light emitting device emitting green light, and a blue (B) light emitting device emitting blue light. Therefore, the kind of the sub-pixel 100 may be determined by the kind of the light emitting device constituting the sub-pixel 100.

In some implementations, the light emitting device may be an inorganic light emitting diode, an organic light emitting diode (OLED) manufactured by using an organic material, and a micro light emitting diode (Micro LED) or a mini LED (mini LED). The micro light emitting diode is a super small inorganic light emitting device with a size less than 100 μm, which is self-luminous without a backlight or a filter.

Figure 4:
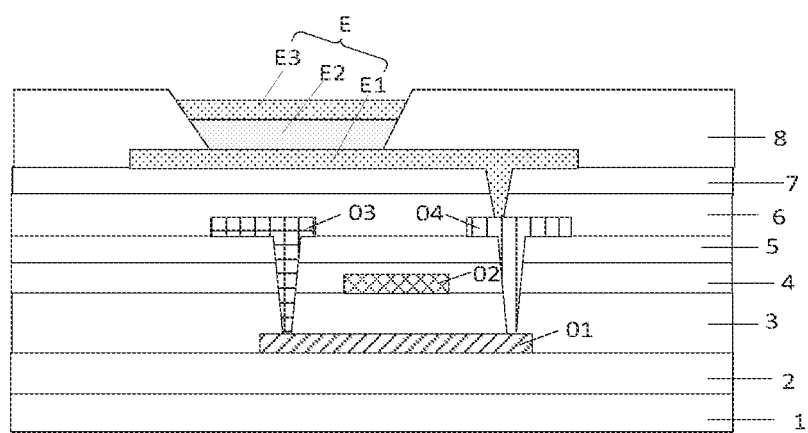
FIG. 4 is a layer structure diagram of a display panel to which a pixel driving circuit provided in an embodiment of the present disclosure is applied.

FIG. 4 is an example of a layer structure of a display panel according to an embodiment of the present disclosure, referring to FIG. 4, a layer structure at a place where the second light emitting control transistor M2 is coupled to the light emitting device E is taken as an example, layer structures of other transistors are substantially the same as that in FIG. 4. The layer structure of the display panel includes a substrate (that is, a base) 1, a buffer layer 2 is arranged on the substrate 1, and the pixel driving structure is arranged between the buffer layer 2 and the light emitting device E; an active layer 01 is arranged on a side of the buffer layer 2, which is away from the substrate 1; a first gate insulating layer 3 is arranged on a side of the active layer 01, which is away from the substrate 1; a gate layer 02 is arranged on a side of the first gate insulating layer 3, which is away from the substrate 1; a second gate insulating layer 4 is arranged on a side of the gate layer 02, which is away from the substrate 1; an interlayer insulating layer 5 is arranged on a side of the second gate insulating layer 4 away from the substrate 1; a source-drain metal layer is arranged on a side, away from the substrate 1, of the interlayer insulating layer 5, the source-drain metal layer includes a source electrode 03 and a drain electrode 04, and the source electrode 03 and the drain electrode 04 are electrically coupled with the active layer 01 through holes in the first gate insulating layer 3, the second gate insulating layer 4 and the interlayer insulating layer 5; a protective layer 6 is arranged on a side of the source-drain metal layer, which is away from the substrate 1; a planarization layer 7 is arranged on a side of the protective layer 6 away from the substrate 1; the light emitting device E is provided on a side, away from the substrate 1, of the planarization layer 7, the light emitting device E includes a first electrode E1, a light emitting layer E2 and a second electrode E3 in a direction from the substrate 1 to itself, the first electrode E1 is coupled with the drain electrode 04 through a through hole arranged in the protective layer 6 and the planarization layer 7, and a pixel defining structure 8 is arranged between adjacent light emitting devices E. Certainly, the layer structure of the display panel is not limited to the above-described structure, and may be other structures, which is not limited herein.

It should be noted that, if the transistor in the pixel driving structure is a double-gate transistor, the second gate insulating layer 4 is further provided with a second gate. The first electrode of each storage capacitor (e.g., the first storage capacitor C1) is disposed in the gate layer 02, and the second electrode of each storage capacitor may be disposed in the second gate insulating layer 4. Other metal wires may also be included in the second gate insulating layer 4, for example, the reset signal lines may be disposed in the second gate insulating layer 4, which is not limited herein.

It will be understood that the above implementations are merely exemplary implementations employed to illustrate the principles of the present disclosure, and the present disclosure is not limited thereto. It will be apparent to those skilled in the art that various changes and modifications can be made without departing from the spirit and scope of the disclosure, and these changes and modifications are to be considered within the scope of the present disclosure.

The invention claimed is:

1. A pixel driving structure, comprising:
   a pulse width modulation driving circuit configured to control a pulse width of a driving current supplied to a light emitting device to be driven according to a pulse width modulation data voltage;
   a pulse amplitude modulation driving circuit configured to control an amplitude of the driving current supplied to the light emitting device to be driven according to a pulse amplitude modulation data voltage; and
   a buffer circuit electrically coupled between the pulse width modulation driving circuit and the pulse amplitude modulation driving circuit for adjusting a rate at which the pulse width modulation driving circuit applies a pulse width modulation voltage to the pulse amplitude modulation driving circuit, wherein
   the pulse amplitude modulation driving circuit comprises a first driving transistor and a first storage capacitor, and wherein,
   a first electrode of the first storage capacitor is electrically coupled with a first power voltage terminal, and a second electrode of the first storage capacitor is electrically coupled with a control electrode of the first driving transistor;
   the buffer circuit comprises a second storage capacitor a first electrode of the second storage capacitor is electrically coupled with the pulse width modulation driving circuit, and a second electrode of the second storage capacitor is electrically coupled with the control electrode of the first driving transistor.

2. The pixel driving structure according to claim 1, wherein the pulse amplitude modulation driving circuit further comprises: a first data writing sub-circuit, a first threshold compensation sub-circuit, a first reset sub-circuit and a first light emitting control sub-circuit; wherein,
   the first data writing sub-circuit is configured to transmit a pulse amplitude modulation data voltage to a first electrode of the first driving transistor in response to an amplitude modulation scan signal;
   the first threshold compensation sub-circuit is configured to compensate for a threshold voltage of the first driving transistor in response to the amplitude modulation scan signal;
   the first light emitting control sub-circuit is configured to transmit the first power voltage to the first driving transistor and output the driving current output from the first driving transistor to the light emitting device to be driven in response to a light emitting control signal;
   the first reset sub-circuit is configured to reset the control electrode of the first driving transistor and the light emitting device to be driven by an initialization signal in response to a reset control signal.

3. The pixel driving structure according to claim 2, wherein the first data writing sub-circuit comprises a first data writing transistor; wherein
   a first electrode of the first data writing transistor is electrically coupled with a pulse amplitude modulation data line, a second electrode of the first data writing transistor is electrically coupled with the first electrode of the first driving transistor, and a control electrode of the first data writing transistor is electrically coupled with an amplitude modulation scan signal line.

4. The pixel driving structure according to claim 2, wherein the first threshold compensation sub-circuit comprises a first threshold compensation transistor, a first electrode of the first threshold compensation transistor is electrically coupled with the control electrode of the first driving transistor, a second electrode of the first threshold compensation transistor is electrically coupled with a second electrode of the first driving transistor, a control electrode of the first threshold compensation transistor is electrically coupled with an amplitude modulation scan signal line.

5. The pixel driving structure according to claim 2, wherein the first light emitting control sub-circuit comprises a first light emitting control transistor and a second light emitting control transistor; wherein
   a first electrode of the first light emitting control transistor is electrically coupled with the first power voltage terminal, a second electrode of the first light emitting control transistor is electrically coupled with the first electrode of the first driving transistor, and a control electrode of the first light emitting control transistor is electrically coupled with a light emitting control signal line;
   a first electrode of the second light emitting control transistor is electrically coupled with a second electrode of the first driving transistor, a second electrode of the second light emitting control transistor is electrically coupled with a first electrode of the light emitting device, and a control electrode of the second light emitting control transistor is electrically coupled with the light emitting control signal line.

6. The pixel driving structure according to claim 2, wherein the first reset sub-circuit comprises a first reset transistor and a second reset transistor; wherein
   a first electrode of the first reset transistor is electrically coupled with the control electrode of the first driving transistor, a second electrode of the first reset transistor is electrically coupled with an initialization signal terminal, and a control electrode of the first reset transistor is electrically coupled with a reset control signal line;
   a first electrode of the second reset transistor is electrically coupled with the initialization signal terminal, a second electrode of the second reset transistor is electrically coupled with a first electrode of the light emitting device, and a control electrode of the second reset transistor is electrically coupled to the reset control signal line.

7. The pixel driving structure according to claim 1, wherein the pulse width modulation driving circuit comprises a second driving transistor and a third storage capacitor; wherein
   a first electrode of the third storage capacitor is electrically coupled with the first power voltage terminal, and a second electrode of the third storage capacitor is electrically coupled with a control electrode of the second driving transistor.

8. The pixel driving structure according to claim 7, wherein the pulse width modulation driving circuit further comprises: a second data writing sub-circuit, a second threshold compensation sub-circuit, a second reset sub-circuit and a second light emitting control sub-circuit; wherein
the second data writing sub-circuit is configured to transmit a pulse width modulation data voltage to a first electrode of the second driving transistor in response to a width modulation scan signal;
the second threshold compensation sub-circuit is configured to compensate for a threshold voltage of the second driving transistor in response to the width modulation scan signal;
the second light emitting control sub-circuit is configured to transmit a sweep frequency signal to the second driving transistor and output a pulse width modulation voltage output from the second driving transistor to the first electrode of the second storage capacitor in response to a light emitting control signal,
the second reset sub-circuit is configured to reset the control electrode of the second driving transistor and the first electrode of the second storage capacitor by an initialization signal in response to a reset control signal.

9. The pixel driving structure according to claim 8, wherein the second data writing sub-circuit comprises a second data writing transistor; wherein
a first electrode of the second data writing transistor is electrically coupled with a pulse width modulation data line, a second electrode of the second data writing transistor is electrically coupled with the first electrode of the second driving transistor, and a control electrode of the second data writing transistor is electrically coupled with a width modulation scan signal line.

10. The pixel driving structure according to claim 8, wherein the second threshold compensation sub-circuit comprises a second threshold compensation transistor, a first electrode of the second threshold compensation transistor is electrically coupled with the control electrode of the second driving transistor, a second electrode of the second threshold compensation transistor is electrically coupled with a second electrode of the second driving transistor, and a control electrode of the second threshold compensation transistor is electrically coupled with a width modulation scan signal line.

11. The pixel driving structure according to claim 8, wherein the second light emitting control sub-circuit comprises a third light emitting control transistor and a fourth light emitting control transistor; wherein
a first electrode of the third light emitting control transistor is electrically coupled with a sweep frequency signal line, a second electrode of the third light emitting control transistor is electrically coupled with the first electrode of the second driving transistor, and a control electrode of the third light emitting control transistor is electrically coupled with a light emitting control signal line;
a first electrode of the fourth light emitting control transistor is electrically coupled with a second electrode of the second driving transistor, a second electrode of the fourth light emitting control transistor is electrically coupled with the first electrode of the second storage capacitor, and a control electrode of the fourth light emitting control transistor is electrically coupled with the light emitting control signal line.

12. The pixel driving structure according to claim 8, wherein the second reset sub-circuit comprises a third reset transistor and a fourth reset transistor; wherein
a first electrode of the third reset transistor is electrically coupled with the control electrode of the second driving transistor, a second electrode of the third reset transistor is electrically coupled with an initialization signal terminal, and a control electrode of the third reset transistor is electrically coupled with a reset control signal line;
a first electrode of the fourth reset transistor is electrically coupled to the initialization signal terminal, a second electrode of the fourth reset transistor is electrically coupled to the first electrode of the second storage capacitor, and a control electrode of the fourth reset transistor is electrically coupled to the reset control signal line.

13. The pixel driving structure according to claim 7, wherein the pulse amplitude modulation driving circuit further comprises: a first data writing sub-circuit, a first threshold compensation sub-circuit, a first reset sub-circuit and a first light emitting control sub-circuit; the pulse width modulation driving circuit further comprises: a second data writing sub-circuit, a second threshold compensation sub-circuit, a second reset sub-circuit and a second light emitting control sub-circuit; wherein
the first data writing sub-circuit is configured to transmit a pulse amplitude modulation data voltage to the first electrode of the first driving transistor in response to an amplitude modulation scan signal;
the first threshold compensation sub-circuit is configured to compensate for a threshold voltage of the first driving transistor in response to the amplitude modulation scan signal;
the first light emitting control sub-circuit is configured to transmit a first power voltage to the first driving transistor and output the driving current output from the first driving transistor to the light emitting device to be driven in response to a light emitting control signal;
the first reset sub-circuit is configured to reset the control electrode of the first driving transistor and the light emitting device to be driven by an initialization signal in response to a reset control signal; and wherein
the second data writing sub-circuit is configured to transmit a pulse width modulation data voltage to a first electrode of the second driving transistor in response to a width modulation scan signal;
the second threshold compensation sub-circuit is configured to compensate for a threshold voltage of the second driving transistor in response to the width modulation scan signal;
the second light emitting control sub-circuit is configured to transmit a sweep frequency signal to the second driving transistor and output a pulse width modulation voltage output from the second driving transistor to the first electrode of the second storage capacitor in response to a light emitting control signal,
the second reset sub-circuit is configured to reset the control electrode of the second driving transistor and the first electrode of the second storage capacitor by an initialization signal in response to the reset control signal.

14. The pixel driving structure according to claim 13, wherein the first data writing sub-circuit comprises a first data writing transistor, a first electrode of the first data writing transistor is electrically coupled with a pulse amplitude modulation data line, a second electrode of the first data writing transistor is electrically coupled with the first electrode of the first driving transistor, and a control electrode of the first data writing transistor is electrically coupled with an amplitude modulation scan signal line;

the first threshold compensation sub-circuit comprises a first threshold compensation transistor, a first electrode of the first threshold compensation transistor is electrically coupled with the control electrode of the first driving transistor, a second electrode of the first threshold compensation transistor is electrically coupled with a second electrode of the first driving transistor, a control electrode of the first threshold compensation transistor is electrically coupled with the amplitude modulation scan signal line;

the first light emitting control sub-circuit comprises a first light emitting control transistor and a second light emitting control transistor, a first electrode of the first light emitting control transistor is electrically coupled with the first power voltage terminal, a second electrode of the first light emitting control transistor is electrically coupled with the first electrode of the first driving transistor, and a control electrode of the first light emitting control transistor is electrically coupled with a light emitting control signal line; a first electrode of the second light emitting control transistor is electrically coupled with a second electrode of the first driving transistor, a second electrode of the second light emitting control transistor is electrically coupled with a first electrode of the light emitting device, and a control electrode of the second light emitting control transistor is electrically coupled with the light emitting control signal line;

the first reset sub-circuit comprises a first reset transistor and a second reset transistor, a first electrode of the first reset transistor is electrically coupled with the control electrode of the first driving transistor, a second electrode of the first reset transistor is electrically coupled with an initialization signal terminal, and a control electrode of the first reset transistor is electrically coupled with a reset control signal line; a first electrode of the second reset transistor is electrically coupled with the initialization signal terminal, a second electrode of the second reset transistor is electrically coupled with a first electrode of the light emitting device, and a control electrode of the second reset transistor is electrically coupled to the reset control signal line;

the second data writing sub-circuit comprises a second data writing transistor, a first electrode of the second data writing transistor is electrically coupled with a pulse width modulation data line, a second electrode of the second data writing transistor is electrically coupled with the first electrode of the second driving transistor, and a control electrode of the second data writing transistor is electrically coupled with a width modulation scan signal line;

the second threshold compensation sub-circuit comprises a second threshold compensation transistor, a first electrode of the second threshold compensation transistor is electrically coupled with the control electrode of the second driving transistor, a second electrode of the second threshold compensation transistor is electrically coupled with a second electrode of the second driving transistor, and a control electrode of the second threshold compensation transistor is electrically coupled with the width modulation scan signal line;

the second light emitting control sub-circuit comprises a third light emitting control transistor and a fourth light emitting control transistor, a first electrode of the third light emitting control transistor is electrically coupled with a sweep frequency signal line, a second electrode of the third light emitting control transistor is electrically coupled with the first electrode of the second driving transistor, and a control electrode of the third light emitting control transistor is electrically coupled with the light emitting control signal line; a first electrode of the fourth light emitting control transistor is electrically coupled with a second electrode of the second driving transistor, a second electrode of the fourth light emitting control transistor is electrically coupled with the first electrode of the second storage capacitor, and a control electrode of the fourth light emitting control transistor is electrically coupled with the light emitting control signal line;

the second reset sub-circuit comprises a third reset transistor and a fourth reset transistor, a first electrode of the third reset transistor is electrically coupled with the control electrode of the second driving transistor, a second electrode of the third reset transistor is electrically coupled with an initialization signal terminal, and a control electrode of the third reset transistor is electrically coupled with the reset control signal line; a first electrode of the fourth reset transistor is electrically coupled to the initialization signal terminal, a second electrode of the fourth reset transistor is electrically coupled to the first electrode of the second storage capacitor, and a control electrode of the fourth reset transistor is electrically coupled to the reset control signal line.

15. The pixel driving structure according to claim 14, wherein a ratio of a capacitance value of the first storage capacitor to a capacitance value of the second storage capacitor is between 1:1 and 2:1.

16. A display panel, comprising a substrate and a plurality of pixel units arranged in an array on the substrate, wherein each pixel unit comprises a plurality of sub-pixels, and each of the sub-pixels comprises the pixel driving structure of claim 15.

17. A display panel, comprising a substrate and a plurality of pixel units arranged in an array on the substrate, wherein each pixel unit comprises a plurality of sub-pixels, and each of the sub-pixels comprises the pixel driving structure of claim 14.

18. The pixel driving structure according to claim 1, wherein a ratio of a capacitance value of the first storage capacitor to a capacitance value of the second storage capacitor is between 1:1 and 2:1.

19. A display panel, comprising a substrate and a plurality of pixel units arranged in an array on the substrate, wherein each pixel unit comprises a plurality of sub-pixels, and each of the sub-pixels comprises the pixel driving structure of claim 1.

* * * * *